US012153628B1

(12) United States Patent
Burkhardt

(10) Patent No.: US 12,153,628 B1
(45) Date of Patent: Nov. 26, 2024

(54) METHOD OF MEASURING TRIANGLE GRAPH CENTRALITY AND RANKING NODES OF INTEREST BASED UPON TRIANGLE GRAPH CENTRALITY

(71) Applicant: The Government of the United States as represented by the Director, National Security Agency, Ft. George G. Meade, MD (US)

(72) Inventor: Paul Burkhardt, North Potomac, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 182 days.

(21) Appl. No.: 17/099,986

(22) Filed: Nov. 17, 2020

(51) Int. Cl.
*G06F 16/901* (2019.01)
*G06F 16/906* (2019.01)
*G06F 17/18* (2006.01)

(52) U.S. Cl.
CPC ........ *G06F 16/9024* (2019.01); *G06F 16/906* (2019.01); *G06F 17/18* (2013.01)

(58) Field of Classification Search
CPC ..... G06F 16/9024; G06F 16/906; G06F 17/18
See application file for complete search history.

(56) References Cited

U.S. PATENT DOCUMENTS

| | | |
|---|---|---|
| 6,285,999 B1 | 9/2001 | Page |
| 6,799,176 B1 | 9/2004 | Page |
| 7,058,628 B1 | 6/2006 | Page |
| 7,269,587 B1 | 9/2007 | Page |
| 9,760,619 B1 * | 9/2017 | Lattanzi ............. G06F 16/285 |
| 2021/0000369 A1 * | 1/2021 | Luksic ............... A61B 5/287 |

* cited by examiner

*Primary Examiner* — Irete F Ehichioya
*Assistant Examiner* — Xiaoqin Hu

(57) ABSTRACT

Methods of measuring graph triangle centrality and for ranking the nodes of a graph based upon the graph triangle centrality measure are provided.

20 Claims, 6 Drawing Sheets

400(cont)

From FIG. 4a

↓

Calculate core triangle centrality using the weighted core-neighborhood triangle sum and the non-triangle neighborhood triangle sum $$X \sum_{u \in N_\Delta^+(v)} \Delta(u) + \sum_{w \in N_\blacksquare(v)} \Delta(w) \text{ or}$$
$$X \sum_{u \in N_\Delta(v)} \Delta(u) + \sum_{w \in N_\blacksquare(v)} \Delta(w)$$

— 418

↓

Normalize the Core Triangle Centrality:

$$\frac{X \sum_{u \in N_\Delta^+(v)} \Delta(u) + \sum_{w \in N_\blacksquare(v)} \Delta(w)}{\Delta(G)} \text{; or}$$
$$\frac{X \sum_{u \in N_\Delta(v)} \Delta(u) + \sum_{w \in N_\blacksquare(v)} \Delta(w)}{\Delta(G)}$$

— 420

↓

Repeat steps 404-420 for all selected nodes of interest — 422

↓

Compare each core triangle centrality/normalized core triangle centrality with each remaining core triangle centrality/normalized core triangle centrality and rank the nodes of interest. — 424

↓

Providing a list of ranked nodes of interest. — 426

FIG. 4b

METHOD OF MEASURING TRIANGLE GRAPH CENTRALITY AND RANKING NODES OF INTEREST BASED UPON TRIANGLE GRAPH CENTRALITY

FIELD OF THE INVENTION

This invention is generally directed to a method of measuring centrality of nodes of interest of a graph and ranking the nodes of interest based upon the centrality measure.

BACKGROUND OF THE INVENTION

Graphs including nodes and edges are commonly used to represent very large data sets wherein the nodes represent data points and the edges connecting these nodes represent relationships between the data points. The following passage gives conventional notation and descriptions of basic properties of graphs that will be used going forward.

A node is also called a vertex, so the terms are used interchangeably. Let G=(V, E) denote a simple, undirected graph with a set of vertices V and a set of edges E, where n=|V| is the number of vertices and m=|E| is the number of edges. Recall that vertical bars surrounding a set denotes the cardinality or size of that set. The notation (h, v) means there is an edge between vertex h and v. Using set builder notation, the adjacency set of a vertex v is denoted by N(v)={h ∈ V|(h, v) ∈ E}. This adjacency set N(v) is also known as the neighborhood of vertex v, hence any vertex h ∈ N(v), meaning h is in N(v), is a neighbor of v and so there exists an edge (h, v). The degree of a node in a graph is the number of nodes connecting to it, meaning the number of neighbors of that node. Then d(v)=|N(v)| denotes the degree of vertex v. The closed neighborhood of a vertex v is denoted by $N^+(v)=N(v) \cup \{v\}$, meaning the neighborhood set includes v. A triangle in a graph is a set of three vertices {u, v, w} such that there is an edge between each pair, hence there are edges (u, v), (u, w), (v, w). A triangle is the simplest non-trivial, fully-connected graph, also known as a clique. The total possible number of triangles in a graph is given by the binomial coefficient $$\binom{n}{3} = \frac{n(n-1)(n-2)}{6},$$

which is colloquially stated as "n choose 3" to mean the total number of unique combinations of three items. Let Δ(v) represent the number of triangles with v. This is known as the local triangle count of a vertex. The global triangle count is the total number of triangles in G and is denoted by Δ(G). The subset of neighbors of v that are in triangles with v is given by $N_A(v)$. Such neighbors are called triangle neighbors. The non-triangle neighbors of a vertex v are those neighbors that are not in triangles with v, the subset of which is given by $N_■(v)$. The neighborhood of v is hence the union of triangle and non-triangle neighbors, $N(v)=N_A(v) \cup N_■(v)$. It follows that $N_■(v)=N(v) N_A(v)$.

In graph theory and network analysis, measures of centrality identify the most important or influential vertices in a graph. Common centrality measures include degree, eigenvector, PageRank, and betweenness.

Degree centrality provides a measure of the number of connections associated with a node. This measure is very simple since degree centrality depends only on the degrees (i.e., the number of connections associated with the node), however, this simplicity also means that degree centrality may not accurately model importance in a complex network.

Eigenvector centrality provides a measure of the number and quality of connections associated with a node. Important nodes under this measure are those with many connections to other important nodes. The advantage of this measure is it gives more weight to connections from important nodes than those that are not important. The disadvantage is it ignores longer range interactions because only direct connections of a node are considered in an eigenvector centrality measure. An eigenvector centrality measure is also relatively expensive to compute because it takes $O(n^3)$ time to compute eigenvectors.

PageRank centrality provides a measure of the number and quality of connections associated with a node and also includes a dampening factor. The page rank algorithm scores the importance of vertices based on both their quantity and quality of links. PageRank is a variant of eigenvector centrality and therefore has similar advantages and disadvantages. It is possible that a node with many low-quality connections may still be considered high-ranking using a PageRank centrality measure due to the nature of having high degree (i.e., many nodes connecting to it), making it susceptible to spurious results or "gaming" of the ranks. The PageRank algorithm was published by Page and Brin in 1998 and made popular by its use for ranking websites for Google Search.

Betweenness centrality provides a measure of the number of shortest-paths a node intersects. The betweenness centrality algorithm calculates the fraction of shortest-paths a vertex intersects over all possible shortest-paths. This implies that an important or central vertex in a graph under a betweenness centrality measure is one whose removal will disrupt the flow of information to many other vertices. The betweenness centrality measure takes into account longer range interactions that are not considered in PageRank and other eigenvector-based centrality measures. Although a betweenness centrality measure relies heavily on distances, it does not capture local subnetwork characteristics. For example, if a graph has two highly connected subgraphs that are bridged by a single node, then that single node is important under a betweenness centrality measure despite having the fewest number of connections. It therefore is less suitable for identifying important vertices that have many connections within the subgraphs. The betweenness centrality measure is also very expensive to compute because it requires finding the shortest-paths between all pairs of vertices, which can take O(mn) time.

In many instances, these centrality measures do not successfully identify important nodes in networks that have strong social network properties and organizational hierarchies where both direct and indirect connectivity needs to be accounted. A key property of these social/hierarchical networks is the presence of many triangles. For example, the Friendster social network dataset (on-line gaming network), available at the Stanford Network Analysis Project (http://snap.stanford.edu/data), is a graph of over 65 million vertices but has over 4 billion triangles. In social network analysis, triangles have been found to indicate network cohesion and clustering. If there is a social network in which every pair of nodes are connected, thus the graph is a clique, then any individual can contact any other individual in a single step. This represents maximum cohesion, and the graph would have the maximum number of triangles possible, e.g., there would be ( ) triangles.

In a social network, a pair of nodes that share a common neighbor implies a minimal degree of mutual association between the pair of nodes. But if that same pair are themselves connected, then there is much stronger cohesion between all nodes in that triangle. Consider an email spammer that sends thousands of emails to random individuals. Most any pair of the email recipients likely have no other association aside from having received an email from the spammer. This should not imply that the spammer is important, especially with respect to each of the recipients. Now consider a social network. A message from an individual to all of his or her direct contacts has more relevance than a message from the email spammer because the recipients are mutually associated rather than just random individuals receiving an email. Hence, most any pair of the friend recipients have some existing association before receiving the same email. This suggests that the email recipients were not just randomly selected for an email message. Current centrality measures do not account for these relationships between the neighboring nodes.

Hierarchies may also have many triangles. The top of the hierarchy in an organization may have very few contacts, but the subordinate contacts are likely connected because they must share similar information or orders handed down by the top. In turn, these subordinates may have many mutual associates that are also members of triangles. Thus, the top node in the hierarchy could have few or no triangles, but if there are many triangles concentrated around its direct contacts and the contacts of the direct contacts, it suggests that top node is important in the network. For example, if the top node in an organizational hierarchy is not associated with any triangles, but a direct contact of the top node is associated with many triangles then that direct contact is in effect conferring the support of its triangle members to the top node; i.e., the top node is receiving support from nodes that are two steps away. Thus, importance of a node is due to the concentration of triangles that surround the node even when the node itself is not involved in many triangles. This indirect support is not modeled by centrality measures such as betweenness and closeness centrality.

Another consideration is the relationship of neighboring nodes. As an example, a first and second node may share a mutual contact. If the first and second nodes are themselves connected, a stronger relationship with the mutual contact exists than the relationship with the mutual contact if the first and second nodes are not themselves connected. In a real-world scenario, this could mean that the first and second nodes have conferred and agreed upon the selection of the mutual node as a contact. Centrality measures such as PageRank and Degree centrality do not account for this indirect connectivity (i.e., the connectivity between the first and second nodes). Rather, in PageRank and Degree centrality measures, the importance of a node depends upon the connection between a node and its neighbors regardless of whether connections exist amongst neighbors. Thus, the email spammer described earlier can incorrectly appear as an important node in the Page Rank and Degree centrality measures.

A new centrality measure that accounts for the concentration of triangles in the local subgraph of each vertex is therefore needed in order to successfully identify important nodes.

SUMMARY OF THE INVENTION

Briefly, the present invention discloses methods for measuring triangle graph centrality and methods for ranking nodes of a graph based upon the triangle graph centrality measures. The nodes of the graph represent data elements in a network and the measures of triangle graph centrality are used to identify the most important/influential nodes (i.e., the most important or influential data elements) in the network.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIGS. 4a-4b illustrate a method of measuring core triangle graph centrality based on a weighted core-neighborhood triangle sum and ranking nodes based upon the measure of core neighborhood triangle sum;

DETAILED DESCRIPTION OF THE PREFERRED EMBODIMENT

Figure 1:
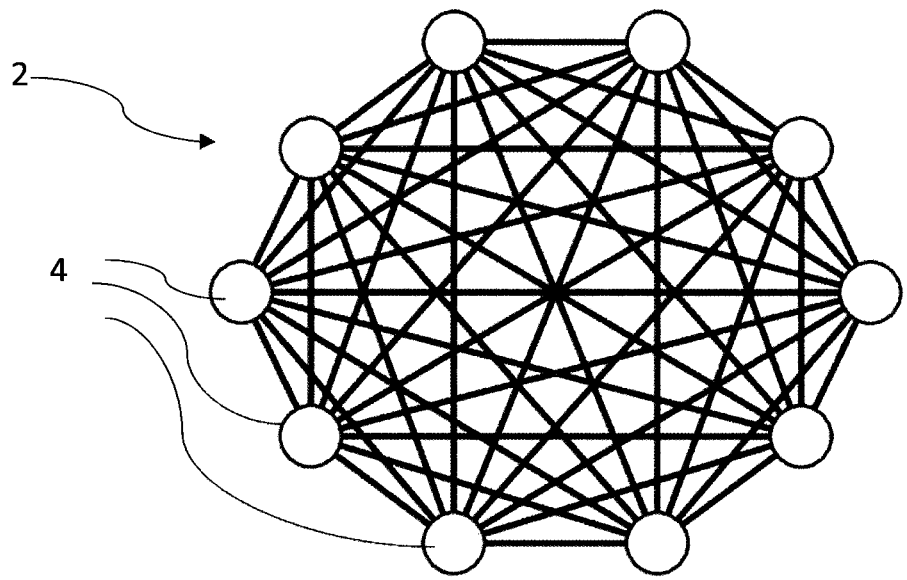
FIG. 1 illustrates a clique graph having ten vertices.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Often the nodes and edges within a graph form triangles. The presence of many triangles within a graph suggest that there are strong or close-knit ties between the data points; that there are mutual associations between the data points; and that data points represent a community structure. The invention provides triangle graph centrality measures based on the following principals/assumptions: (1) a vertex connected to neighbors having high triangle counts is important; (2) if many vertices with mutually-connected neighbors are also connected to a common vertex, that common vertex is important; and (3) influence more easily spreads in networks with many triangles because there are more edges and therefore pathways to reach all nodes. In addition, importance is due to the concentration of triangles that surround a node but that node itself need not be involved in many triangles. The invention further provides a method of ranking connected nodes of a graph G based upon the triangle graph centrality measures. The nodes of the graph G represent data elements in a network and the measure of triangle graph centrality is used to identify the most important/influential nodes (i.e., data elements) in the network.

A clique is a set of vertices in a graph wherein each pair of the vertices of the set is joined by an edge. A clique represents the strongest cohesion of vertices in a graph. Thus any vertex in a clique can quickly contact or influence every other vertex because of the proximity of being one step away. A clique also has the maximum number of triangles possible among the vertices in the clique. A clique of n vertices has ( ) triangles. For example, a clique 2 having ten vertices 4, is illustrated in FIG. 1. Clique 2 has 120 triangles; i.e., ( )=120 triangles.

Figure 2:
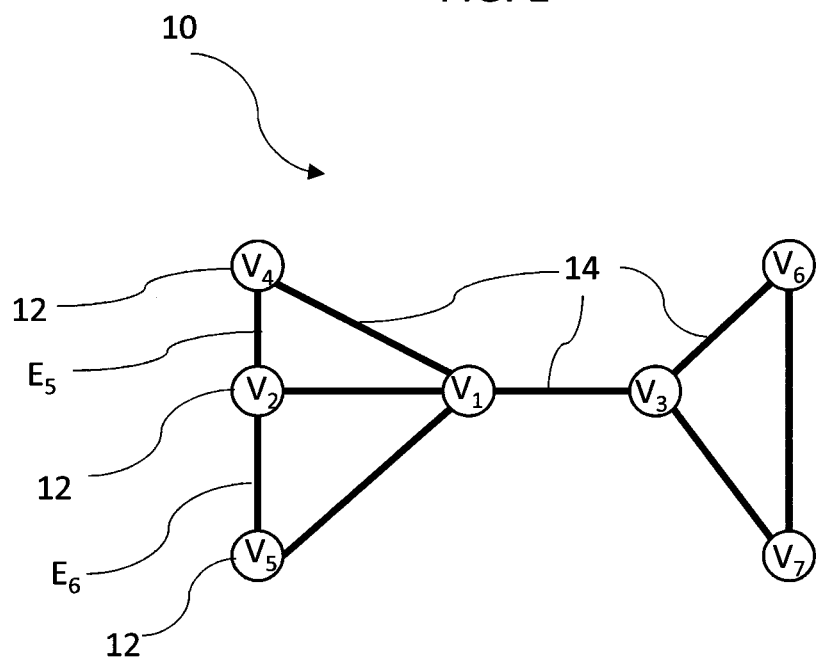
FIG. 2 illustrates a graph representing a small data set.

An example graph (G) 10 representing a very small data set is illustrated in FIG. 2 for the purpose of defining terminology to be used and for describing the triangle centrality measures of the invention. The graph (G) 10 represents data points of the data set using nodes/vertices (V) 12 and edges (E) 14 connecting certain vertices (V) 12. Note that the label 14 for edges applies to all edges in (G) 10. For ease of discussion, the vertices 12 in FIG. 2 are labeled $V_1$-$V_7$. Edges 14 connecting the vertices 12 represent a relationship between the data points. The graph G, therefore is defined by the vertices 12 and edges 14; i.e., G=(V, E). A node 12 connected to another node 12 by an edge 14 are defined as neighboring nodes. In FIG. 2 for example, node $V_1$ is selected as a node of interest. The neighborhood of node $V_1$ includes nodes $V_2$, $V_3$, $V_4$, and $V_5$, because an edge connects $V_1$ to $V_2$, an edge connects $V_1$ to $V_3$, an edge connects $V_1$ to $V_4$, and an edge connects $V_1$ to $V_5$. In the case of node of interest $V_1$ for example, the closed neighborhood of $V_1$ includes nodes $V_1$, $V_2$, $V_3$, $V_4$, and $V_5$. An "open neighborhood" of a node of interest includes all neighboring nodes but does not include the node of interest. In the case of node of interest $V_1$, for example, the open neighborhood of $V_1$ includes nodes $V_2$, $V_3$, $V_4$, and $V_5$. Continuing to observe node of interest, $V_1$, each neighboring node is identified as either a "triangle-neighbor", u, or as a "non-triangle-neighbor", w. When a neighboring node is connected by an edge to another neighboring node, the neighboring node is defined as a triangle-neighbor, u. Each neighboring node $V_2$, $V_4$, and $V_5$ is connected to another neighboring node by an edge E and therefore each neighboring node $V_2$, $V_4$, and $V_5$ is identified as triangle-neighbor, u, of node $V_1$. Specifically, neighboring nodes $V_2$ and $V_4$ are connected by edge $E_5$ and neighboring nodes $V_2$ and $V_5$ are connected by edge $E_6$. In contrast, neighboring node $V_3$ is not connected to any of $V_1$'s remaining neighboring nodes. Vertex $V_3$, therefore, is identified as a non-triangle-neighbor, w, of node $V_1$.

The triangle graph centrality measures of the present invention are centered on various triangle counts and various prior art tools may be used to determine particular triangle counts. For example, Neo4j (www.neo4j.com) and Networkx (networkx.github.io) are tools which may be used to determine global and local triangle counts. Various triangle counts are defined below as follows:

A global triangle count identifies the total number of triangles provided in the graph. Using the simple graph 10 of FIG. 2, for example, the global triangle count $\Delta(G)$ associated with graph, G is 3; i.e., $\Delta(G)=3$.

A local triangle count, A (v), is a triangle count associated with a particular vertex. For example, vertex $V_1$ of FIG. 2 is associated with triangle $\{V_1, V_2, V_4\}$ and triangle $\{V_1, V_2, V_5\}$, therefore, the local triangle count for vertex $V_1$ is 2; i.e., A ($V_1$)=2.

A closed neighborhood triangle sum, $S_h^+$, for a node of interest is the sum of all triangle counts associated with the node of interest and the triangle counts associated with each neighbor of the node of interest (including triangle neighbors and non-triangle neighbors). A closed neighborhood triangle sum, $S_h^+$, may be represented with the following notation, $\Sigma_{h \in N^+(v)}\Delta(h)$, An open neighborhood triangle sum, S. for a node of interest is the sum of all triangle counts associated with each node neighboring the node of interest (including triangle neighbors and non-triangle neighbors). An open neighborhood triangle sum, $S_h$, may be represented with the following notation, $\Sigma_{h \in N(v)}\Delta(h)$.

A closed core-neighborhood triangle sum, $S_u^+$ for a node of interest is the sum of all triangle counts associated with the node of interest and the triangle counts associated with each triangle-neighbor of the node of interest. A closed core-neighborhood triangle sum, S' may be represented with the following notation, E $$\sum_{u \in N_\Delta^+(v)} \Delta(u).$$

An open core-neighborhood triangle sum, $S_u$, for a node of interest is the sum of the triangle counts associated with each triangle-neighbor of the node of interest. An open core-neighborhood triangle count may be represented with the following notation, $\Sigma_{u \in N_\Delta(v)}\Delta(u)$.

The following dictionary summarizes the various neighborhood triangle sums that will be used throughout this discussion.

| Label | Equation | Description |
| --- | --- | --- |
| $S_h$ | $\Sigma_{h \in N(v)}\Delta(h)$ | open neighborhood triangle sum |
| $S_h^+$ | $\Sigma_{h \in N^+(v)}\Delta(h)$ | closed neighborhood triangle sum |
| $S_u$ | $\Sigma_{u \in N_\Delta(v)}\Delta(u)$ | open core-neighborhood triangle sum |
| $S_u^+$ | $\sum_{u \in N_\Delta^+(v)} \Delta(u)$ | closed core-neighborhood triangle sum |
| $S_w$ | $\Sigma_{w \in N_\blacksquare(v)}\Delta(w)$ | non-triangle neighborhood triangle sum |

Figure 3:
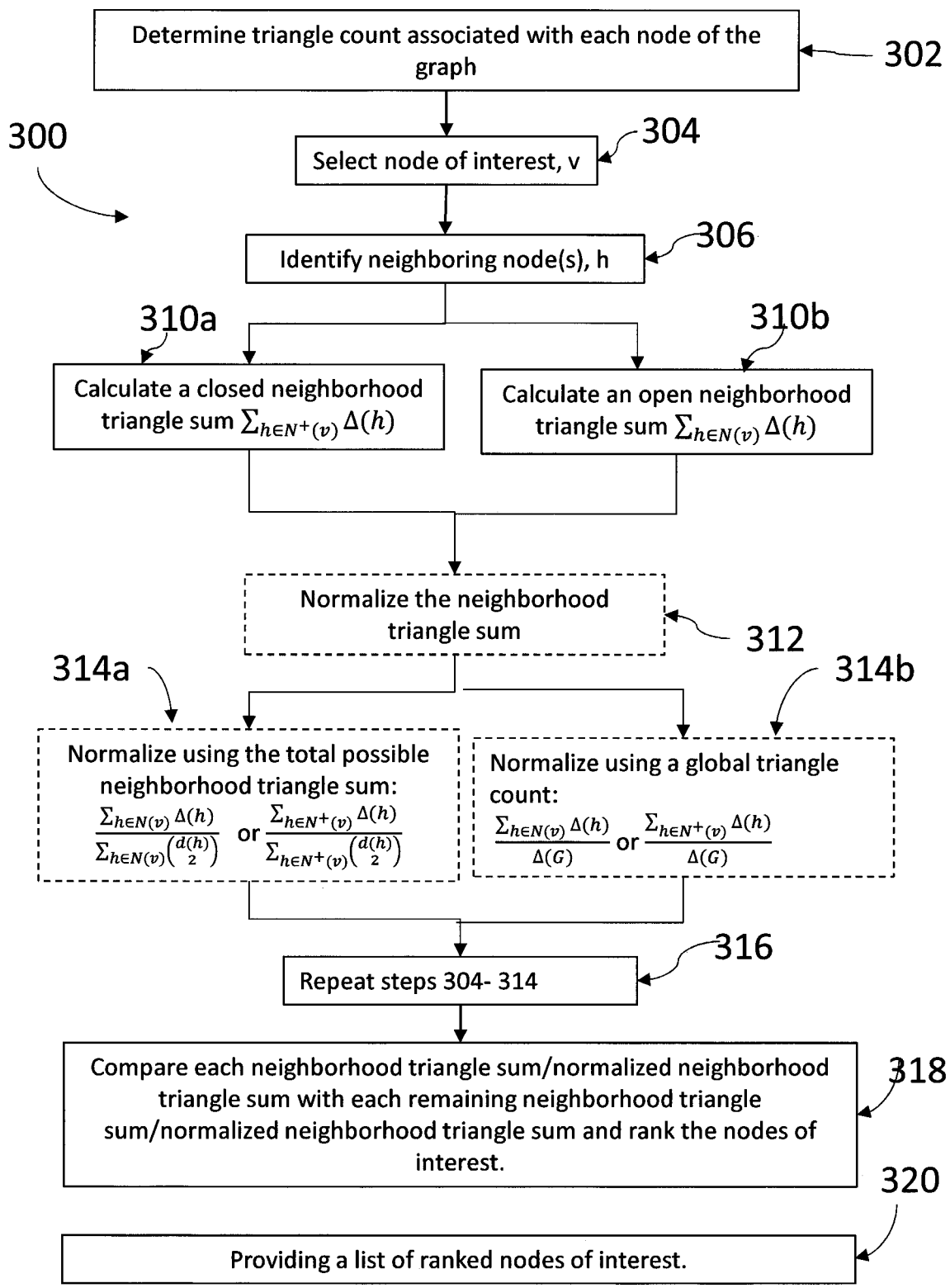
FIG. 3 illustrates a method of measuring neighborhood triangle centrality based on a neighborhood triangle sum and ranking nodes based upon the neighborhood triangle centrality-type triangle graph centrality measure.
Figure 4A:
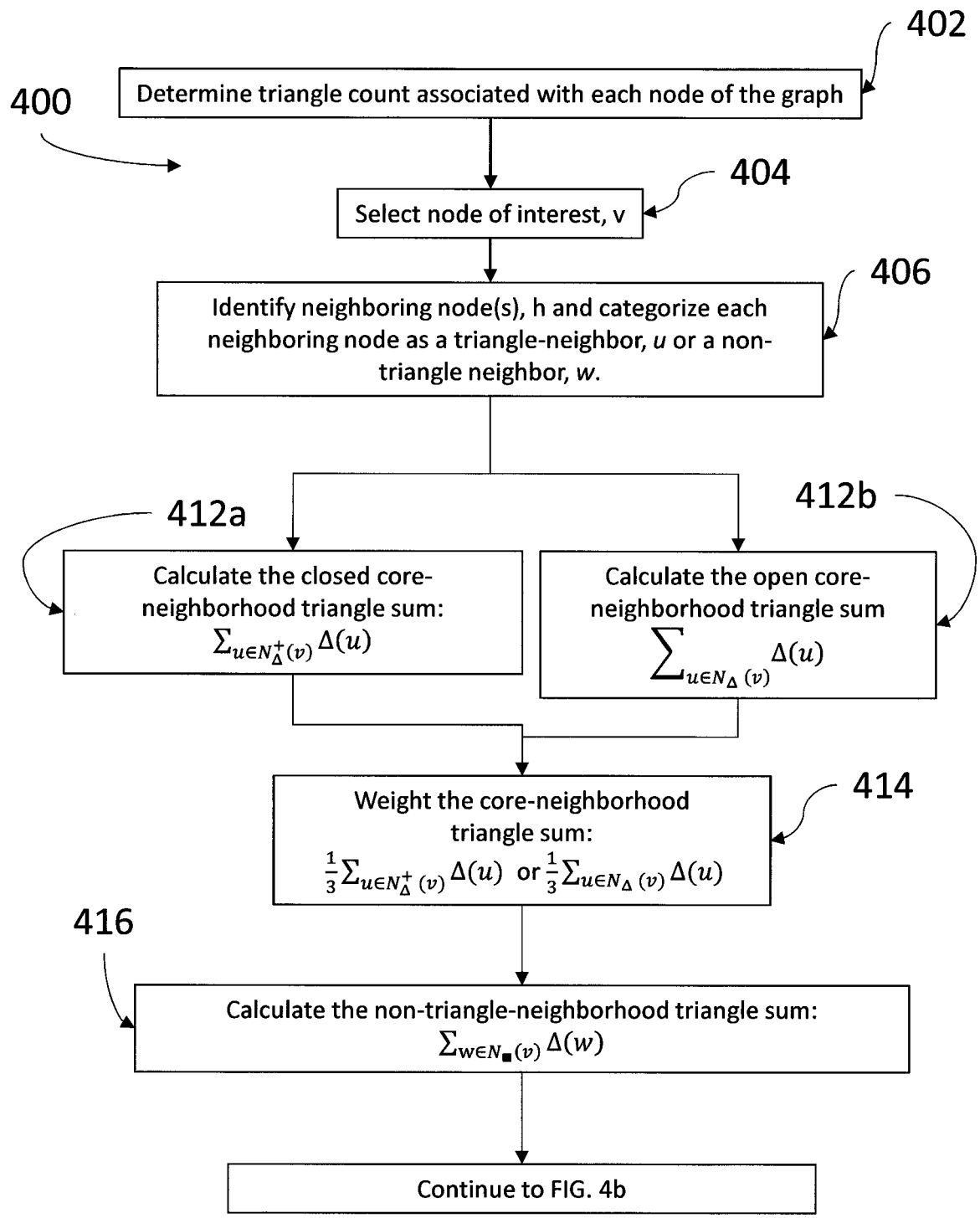

Various triangle graph centrality measures are provided by the invention to measure the importance/significance of a node of interest within a graph. Specifically, neighborhood triangle centrality is illustrated in FIG. 3 and core triangle centrality is illustrated in FIG. 4. These triangle graph centrality measures identify an important vertex/node based on the number of triangles associated with the vertex and its neighbors with respect to the overall count of triangles in the graph. The bases for the triangle graph centrality measures of the present invention are:

1) a vertex connected to neighbors having high triangle counts is important;
2) if many vertices with mutually-connected neighbors are also connected to the same vertex, that same vertex must be important, and
3) influence spreads more easily because the presence of triangles coincides with a denser network, meaning more pathways for influence.

The neighborhood triangle centrality measure based on a neighborhood triangle sum, $S_h$, illustrated in FIG. 3 includes summing the local triangle counts associated with neighbors of a node of interest. The core triangle centrality measure based on a weighted core-neighborhood triangle sum, $S_u$, illustrated in FIG. 4 includes summing the local triangle counts associated with triangle-neighbors for a node of interest. In each method of measuring triangle graph centrality, the centrality can be normalized as desired and also the measure may be based upon an open or closed neighborhood (i.e., exclusive or inclusive of the node of interest). Each of these triangle graph centrality measures will be described in detail below.

A method 300 of measuring neighborhood triangle centrality is illustrated in FIG. 3. The method 300 begins as illustrated in step 302 by receiving a graph including nodes representing data points and edges representing the relationships between those data points and determining the triangle count $\Delta(v)$ associated with each node of the graph.

Next at step 304, a node of interest, v, for which the neighborhood triangle centrality is to be measured is selected. As an example, we will discuss the neighborhood triangle graph centrality measure for selected node of interest, $V_1$ of FIG. 2.

Next, at step 306 the neighboring nodes, h, of the node of interest are identified. In FIG. 2 for example, node of interest $V_1$ has four neighboring nodes, $V_2$, $V_3$, $V_4$, and $V_5$.

Next at step 310, a neighborhood triangle sum is determined. As represented by steps 310a and 310b, the neighborhood triangle sum may be either a closed neighborhood triangle sum, $S_h^+$, provided by $\Sigma_{h \in N+(-)}\Delta(h)$, or the neighborhood triangle sum may be an open neighborhood triangle sum, $S_h$, provided by $\Sigma_{h \in N(v)}\Delta(h)$. The closed neighborhood triangle sum, $S_h^+$, is determined by summing the triangle counts associated with the node of interest and the triangle counts associated with each neighboring node h. The open neighborhood triangle sum, $S_h$, is determined by summing the triangle counts associated with each neighboring node h. For example, using $V_1$ as the node of interest, the closed neighborhood triangle sum is:

$$CNTS = \Delta(V_1) + \Delta(V_2) + \Delta(V_3) + \Delta(V_4) + \Delta(V_5)$$
$$= 2 + 2 + 1 + 1 + 1$$
$$= 7$$

Alternatively, using $V_1$ as the node of interest, the open neighborhood triangle sum is:

$$= \Delta(V_2) + \Delta(V_3) + \Delta(V_4) + \Delta(V_5)$$
$$= 2 + 1 + 1 + 1$$
$$= 5$$

Next at step 312, the neighborhood triangle sum may optionally be normalized. Although other methods of normalization may be used, two methods of normalization are illustrated and described herein.

As illustrated at step 314a, the neighborhood triangle sum may be normalized using the total possible neighborhood triangle sum. Specifically, the sum of the possible triangle counts for all neighbors is calculated. Since the possible triangle count for any vertex v is given by its "degree choose 2" binomial coefficient, i.e., $$\binom{d(h)}{2},$$

the total possible neighborhood triangle sum for a closed neighborhood is, $$\Sigma_{h \in N^+(v)} \binom{d(h)}{2}.$$

For example, using $V_1$ as the node of interest and summing in order $V_1$, $V_2$, $V_3$, $V_4$, $V_5$, the total possible closed neighborhood triangle sum is:

$$\binom{4}{2} + \binom{3}{2} + \binom{3}{2} + \binom{2}{2} + \binom{2}{2} = 6 + 3 + 3 + 1 + 1 = 14$$

The normalized closed neighborhood triangle sum $S_h^+$ is therefore provided by the closed neighborhood triangle sum divided by the total possible closed neighborhood triangle sum:

$$CNTS_N = \frac{\Sigma_{h \in N^+(v)} \Delta(h)}{\Sigma_{h \in N^+(v)} \binom{d(h)}{2}}.$$

Using node $V_1$ of the FIG. 2 as the node of interest:

$$CNTS_N(V_1) = \frac{7}{14} = 0.50$$

Alternatively, the total possible neighborhood triangle sum for an open neighborhood is:

$$\Sigma_{h \in N(v)} \binom{d(h)}{2}.$$

For example, using $V_1$ as the node of interest and summing in order $V_2$, $V_3$, $V_4$, $V_5$, the total possible closed neighborhood triangle sum is:

$$\binom{3}{2} + \binom{3}{2} + \binom{2}{2} + \binom{2}{2} = 3 + 3 + 1 + 1 = 8$$

The normalized open neighborhood triangle sum $S_h$ is therefore provided by the open neighborhood triangle sum divided by the total possible open neighborhood triangle sum:

$$ONTS_N = \frac{\Sigma_{h \in N(v)} \Delta(h)}{\Sigma_{h \in N(v)} \binom{d(h)}{2}}.$$

Using node $V_1$ of the FIG. 2 as the node of interest:

$$ONTS_N(V_1) = \frac{5}{8} = 0.625$$

As illustrated at step 314b, the neighborhood triangle sum may be normalized using the global triangle count. Using the simple graph 10 of FIG. 2, for example, the global triangle count $\Delta(G)$ associated with graph, G is 3; i.e., $\Delta(G)=3$. The normalized closed neighborhood triangle sum $S_h^+$ is therefore provided by the closed neighborhood triangle sum divided by the global count:

$$CNTS_N = \frac{\sum_{h \in N^+(v)} \Delta(h)}{\Delta(G)}.$$

For example, using node $V_1$ of the FIG. 2 as the node of interest:

$$CNTS_N(V_1) = \frac{7}{3} = 2.33$$

Alternatively, the normalized open neighborhood triangle sum $S_h$ is provided by the open neighborhood triangle sum divided by the global triangle count:

$$ONTS_N = \frac{\sum_{h \in N(v)} \Delta(h)}{\Delta(G)}.$$

Using node $V_1$ of the FIG. 2 as the node of interest:

$$ONTS_N(V_1) = \frac{5}{3} = 1.67$$

In yet another alternative, the neighborhood triangle sum may be normalized using a clustering coefficient, either inclusive or not inclusive of v. The clustering coefficient cc(v) for a vertex v is given by, $$cc(v) = \frac{\Delta(v)}{\binom{d(v)}{2}}.$$

The neighborhood triangle sum normalized using the clustering coefficient is then, $$CNTS_N(v) = \Sigma_{h \in N+(v)} cc(v) \text{ or}$$

$$ONTS_N(v) = \Sigma_{h \in N(v)} cc(v)$$

In this form, the contribution from each vertex is locally normalized by its total possible triangles rather than normalizing the contribution across the sum of possible triangle counts from all neighbors. In the case where all neighbors are in separate cliques and therefore have nearly the maximum possible clustering coefficient, their contribution to the rank of a vertex is primarily independent of the other neighbors. Dividing this version of neighborhood triangle sum by d(v) or d(v)+1 depending on the inclusion choice helps to standardize the rank by how many neighbors the vertex v of interest may have.

As illustrated in FIG. 3, at step 316, steps 304-314 are repeated for each node of interest. Although steps 304-314 may be performed sequentially for each node of interest, preferably steps 304-314 are performed simultaneously and independently for each node of interest selected. In any computation, sequential or parallel, the total number of steps is always a constant regardless of the size of the graph or number of triangles. When steps 304-314 are simultaneously performed for each of the selected nodes, the entire computation for all vertices may be completed in two rounds; one round for computing all triangle counts (i.e., triangle counts associated with each node) and a second round for computing the neighborhood triangle count.

At step 318 the triangle neighborhood sums/normalized triangle neighborhood sums are compared and the nodes of interest are ranked.

At step 320 a list of ranked nodes is provided.

The method 400 of measuring core triangle centrality and ranking nodes is illustrated in FIG. 4. The method begins at step 402 by receiving a graph including nodes representing data points and edges representing the relationships between those data points and determining a triangle count associated with each node of the graph.

Next at step 404, a node of interest for which core triangle centrality is to be measured is selected. For example, we will discuss the core triangle centrality measure for selected node of interest $V_1$ of FIG. 2.

Next at step 406, the neighboring nodes of the node of interest are identified and each neighboring node is categorized as triangle-neighbor, u, or a non-triangle-neighbor, w. In FIG. 2 for example, node of interest $V_1$ has four neighboring nodes, $V_2$, $V_3$, $V_4$, and $V_5$. Nodes $V_2$, $V_4$, and $V_5$ are categorized as triangle-neighbors, u, and node $V_3$ is identified as a non-triangle-neighbor, w.

Next at step 412, the core neighborhood triangle sum is determined. The core-neighborhood triangle sum is the sum of the local triangle counts for the triangle-neighbors u. As illustrated at step 412a, the core-neighborhood triangle sum may be a closed core-neighborhood triangle sum, $S_u^+$:

$$\sum_{u \in N_\Delta^+(v)} \Delta(u).$$

For example, using $V_1$ as the node of interest the closed core neighborhood triangle sum $S_u^+$, is:

$$= \Delta(V_1) + \Delta(V_2) + \Delta(V_4) + \Delta(V_5)$$
$$= (2 + 2 + 1 + 1)$$
$$= 6$$

Alternatively, as illustrated at step 412b, the core-neighborhood triangle sum may be an open core triangle neighborhood sum, $S_u$:

$$\Sigma_{u \in N_\Delta(v)} \Delta(u).$$

For example, using $V_1$ as the node of interest the open core triangle-neighborhood sum is:

$$= \Delta(V_2) + \Delta(V_4) + \Delta(V_5)$$
$$= (2 + 1 + 1)$$
$$= 4$$

Next, at step 414, the core-neighborhood triangle sum is weighted, "weighted $S_u$". For example, the core-neighborhood triangle sum may be mitigated or enhanced. In the case of mitigation, for example, to avoid over-counting from triangle neighbors, mitigation may be provided by dividing the core-neighborhood triangle sum by three since the same triangle is counted thrice. Thus, a mitigated closed core-neighborhood triangle sum may be provided by:

$$\frac{1}{3}\sum_{u \in N_\Delta^+(v)} \Delta(u)$$

Alternatively, a mitigated open core-neighborhood triangle sum is provided by:

$$\frac{1}{3}\sum_{u \in N_\Delta^+(v)} \Delta(u).$$

Although mitigation has been described as dividing the core-neighborhood triangle sum by three, other means of mitigation are permissible. For example, dividing by another number. Still other means of mitigating the over-count is permitted such as dividing by three for only the triangles that are incident upon neighbor u and the node of interest since u may have triangles that do not involve the node of interest.

Weighting of the core-neighborhood triangle sum may also be provided by enhancing the core-neighborhood triangle count. For example, contribution from triangle neighbors u can be given more weight by multiplying the core-neighborhood triangle sum by some number greater than one.

Next at step 416, the non-triangle neighborhood triangle sum, $S_w$, is determined. Specifically, the local triangle counts of non-triangle-neighbors, w, are summed to provide a non-triangle-neighborhood triangle sum, $S_w$. The non-triangle neighborhood triangle count is:

$$\sum_{w \in N_\blacksquare(v)} \Delta(w)$$

Recall that $N_\blacksquare(v) = N(v) N_\Delta(v)$ denotes the set difference between sets $N(v)$ and $N_\Delta(v)$, leaving the set of neighbors of v that are in set $N(v)$ but not in the set $N_\Delta(v)$; i.e., the non-triangle neighbors, w. For example, using $V_1$ as the node of interest the non-triangle neighborhood triangle sum is:

$$N_\blacksquare(v) = \Delta(V_3) = 1$$

At step 418, core triangle centrality is calculated by summing the weighted core-neighborhood triangle sum, weighted $S_u$, (either closed or open) and the non-triangle neighborhood triangle sum, $S_w$. Using a weighted closed-core-neighborhood triangle sum where weighting is denoted by X, for example, the core triangle centrality (CTC) is provided by:

$$\text{Core Triangle Centrality} = X\sum_{u \in N_\Delta^+(v)} \Delta(u) + \sum_{w \in N_\blacksquare(v)} \Delta(w)$$

Optionally, at step 420, core triangle centrality (CTC) for each node of interest may be normalized by dividing the core triangle centrality for each node of interest by the global triangle count to provide a normalized core triangle centrality. For example, a normalized core triangle centrality measure ($CTC_N$) is provided by:

$$\text{Core Triangle Centrality}_N(v) = \frac{\frac{1}{3}\sum_{u \in N_\Delta^+(v)} \Delta(u) + \sum_{w \in N_\blacksquare(v)} \Delta(w)}{\Delta(G)}$$

Using node $V_1$ of the FIG. 2 as the node of interest, the normalized core triangle centrality measure is:

$$\text{Core Triangle Centrality}_N(v_1) = \frac{\frac{1}{3}(6)+1}{3} = 1.$$

As noted at step 422, steps 404-420 are performed for each node of interest selected. Although steps 404-420 may be performed sequentially for each node of interest, preferably steps 404-420 are performed simultaneously and independently for each node of interest selected. In any computation, sequential or parallel, the total number of steps is always a constant regardless of the size of the graph or number of triangles. When steps 404-420 are simultaneously performed for each of the selected nodes, the entire computation for all vertices may be completed in three rounds; one round for computing all triangle counts, a second round for computing the weighted core-neighborhood triangle sums and, finally, a third for computing core triangle centrality.

At step 424, the core triangle centrality measure (or optionally the normalized core triangle centrality measure) for each node of interest is compared to the remaining core triangle centrality measures and each node is ranked For example, the core triangle centrality measures are ordered from the highest value to lowest value and the node associated with the highest value is identified as the most relevant node/vertex.

At step 426 a list of ranked nodes is provided.

Figure 5:
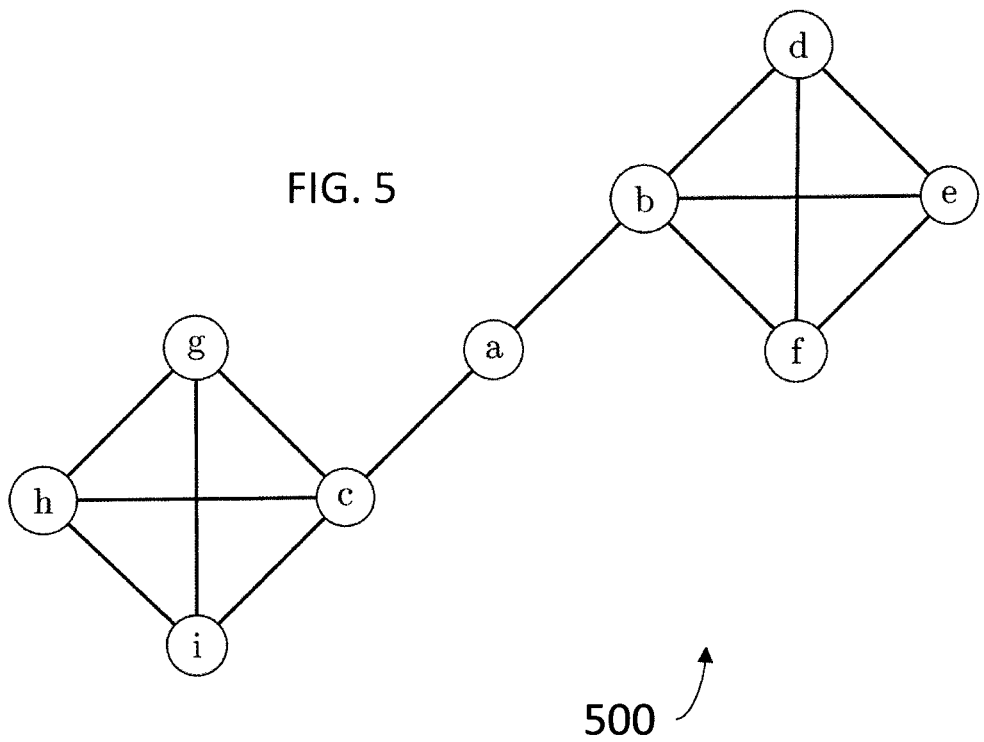
FIG. 5 illustrates a graph representing a small data set for which a comparison of node rankings using various measures of centrality has been provided.

A simple graph 500 of FIG. 5 is used to provide a comparison of rankings resulting from the graph centrality measures of the present invention with other centrality measures. Table A below provides the resulting rankings for each node in graph using the core triangle centrality measure of the present invention and using various prior art centrality measures discussed above.

TABLE A

Comparison of rankings resulting from core triangle centrality measure to rankings based on various prior art centrality measures.

| Core Triangle Centrality (CTC) | PageRank (PR) | Betweenness Centrality (BC) | Eigenvector Centrality (EV) | Degree Centrality (DC) |
|---|---|---|---|---|
| a(1)* | b(1) | a(1)* | b(1) | b(1) |
| b(2) | c(1) | b(2) | c(1) | c(1) |
| c(2) | d(2) | c(2) | d(2) | d(2) |
| d(2) | e(2) | | e(2) | e(2) |
| e(2) | f(2) | | f(2) | f(2) |
| f(2) | g(2) | | g(2) | g(2) |
| g(2) | h(2) | | h(2) | h(2) |
| h(2) | i(2) | | i(2) | i(2) |
| i(2) | a(3) | | a(3) | a(3) |

Observing graph 500 and applying the principles described above (1) a vertex connected to neighbors having high triangle counts is important; (2) if many vertices with mutually-connected neighbors are also connected to a common vertex, that common vertex is important; and (3)

influence more easily spreads because the presence of triangles coincides with a denser network, meaning more pathways for influence. It is observed that node a should be the highest rank node of the graph. As illustrated in Table A, however, only core triangle centrality and betweenness centrality correctly provide node a with the highest ranking.

Figure 6:
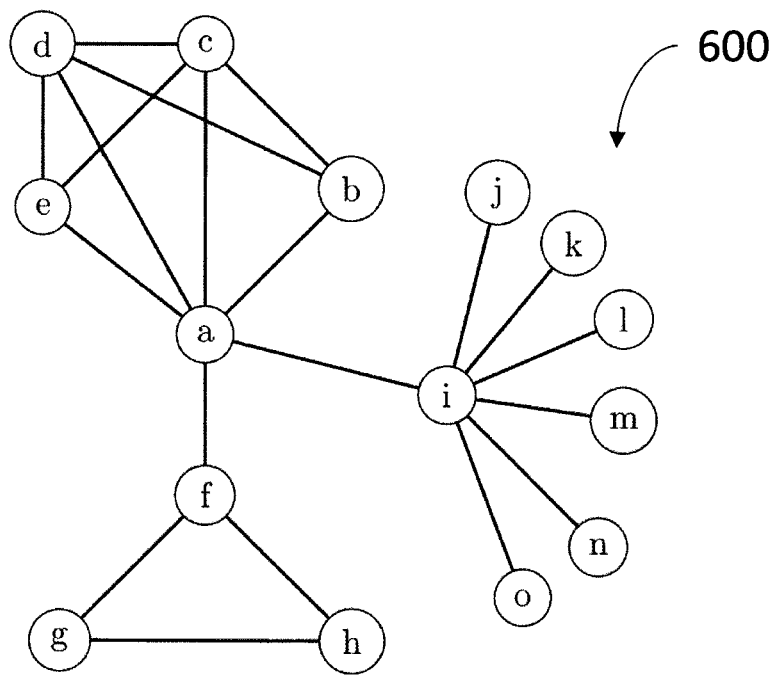
FIG. 6 illustrates a graph representing a small data set for which a comparison of node rankings using various measures of centrality has been provided.

A simple graph 600 of FIG. 6 is used to provide another comparison of rankings resulting from the core triangle centrality measure of the present invention with prior art centrality measures. Table B below provides the resulting rankings for each node in graph 600 using the core triangle centrality measure of the present invention and using various prior art centrality measures discussed above.

TABLE B

Comparison of rankings based on core triangle centrality measure to rankings based on various other prior art centrality measures.

| Core Triangle Centrality (CTC) | PageRank (PR) | Betweenness Centrality (BC) | Eigenvector Centrality (EV) | Degree Centrality (DC) |
|---|---|---|---|---|
| a(1)* | i(1) | i(1) | a(1)* | i(1) |
| c(2) | a(2) | a(2) | c(2) | a(2) |
| d(2) | c(3) | f(3) | d(2 | c(3) |
| b(3) | d(3) | c(4) | b(3) | d(3) |
| e(3) | f(4) | d(4) | e(3) | b(4) |
| f(3) | b(5) | | i(4) | e(4) |
| i(4) | e(5) | | f(5) | f(4) |
| g(5) | g(6) | | g(6) | g(5) |
| h(5) | h(6) | | h(6) | h(5) |
| | j(7) | | i(7) | j(6) |
| | k(7) | | j(7) | k(6) |
| | l(7) | | k(7) | l(6) |
| | m(7) | | l(7) | m(6) |
| | n(7) | | m(7) | n(6) |
| | o(7) | | n(7) | o(6) |

Observing graph 600 and applying the principles described above (1) a vertex connected to neighbors having high triangle counts is important; (2) if many vertices with mutually-connected neighbors are also connected to a common vertex, that common vertex is important; and (3) influence more easily spreads because the presence of triangles coincides with a denser network, meaning more pathways for influence. It is observed that node a should be the highest rank node of the graph. As illustrated in Table B, however, only core triangle centrality and eigenvector centrality correctly provide node a with the highest ranking.

Figure 7:
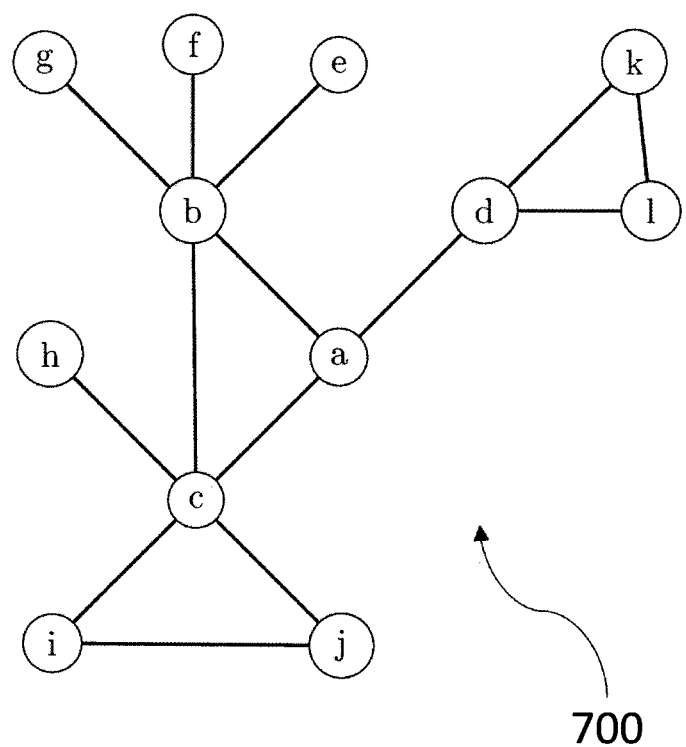
FIG. 7 illustrates a graph representing a small data set for which a comparison of node rankings using various measures of centrality has been provided.

A simple graph 700 of FIG. 7 is used to provide another comparison of rankings resulting from the core triangle centrality measures of the present invention with other prior art centrality measures. Table C below provides the resulting rankings for each node in graph 700 using the core triangle centrality measure of the present invention and using various prior art centrality measures discussed above.

TABLE C

Comparison of rankings based on core triangle centrality measures to rankings based on various other centrality measures.

| Core Triangle Centrality (CTC) | PageRank (PR) | Betweenness Centrality (BC) | Eigenvector Centrality (EV) | Degree Centrality (DC) |
|---|---|---|---|---|
| a(1)* | b(1) | b(1) | c(1) | b(1) |
| c(2) | c(2) | c(2) | b(2) | c(1) |
| d(2) | d(3) | a(3) | a(3) | a(2) |
| h(2) | a(4) | d(4) | i(4) | d(2) |
| b(3) | k(5) | | j(4) | i(3) |
| i(3) | l(5) | | d(5) | j(3) |
| j(3) | i(6) | | h(6) | k(3) |
| e(4) | j(6) | | e(7) | l(3) |
| f(4) | e(7) | | f(7) | e(4) |
| g(4) | f(7) | | g(7) | f(4) |
| k(4) | g(7) | | k(8) | g(4) |
| l(4) | h(8) | | l(8) | h(4) |

Observing graph 700 and applying the principles described above (1) a vertex connected to neighbors having high triangle counts is important; (2) if many vertices with mutually-connected neighbors are also connected to a common vertex, that common vertex is important; and (3) influence more easily spreads because the presence of triangles coincides with a denser network, meaning more pathways for influence. It is observed that node a should be the highest rank node of the graph. As illustrated in Table C, however, only triangle centrality correctly provides node a with the highest ranking.

As illustrated in Tables A-C, core triangle centrality measures find important vertices that are missed by other centrality measures. Unlike other centrality measures, core triangle centrality recognizes the importance of a node based upon mutual connections with well-connected neighbors.

In addition to the ability to find important nodes not found using other graph centrality measures, triangle graph centrality provides a fast runtime with a constant number of steps. The computations for triangle graph centrality are non-iterative and therefore may be directly computed thereby decreasing the time required to rank the nodes of interest in comparison with other centrality-based rankings.

The time complexity of triangle graph centrality is asymptotically equivalent to triangle counting. Recall the time complexity refers to the work as a function of the input size. It relates to the performance or runtime. The asymptotic bounds for time complexity are written using Landau notation, colloquially known as "Big-Oh" notation. Hence if the worst-case time complexity is quadratic with respect to the input size n, then it is written as $O(n^2)$ time, where O represents the asymptotic upper-bound, ignoring constants.

A first stage in computing core triangle centrality is to get the local triangle count of every vertex in the graph. This step can be achieved by any triangle counting algorithm and takes $O(m^{3/2})$ time; recall m represents the number of edges in the graph. The processes of determining graph centrality described in connection with FIGS. 3 and 4 utilize a triangle counting algorithm and save the local triangle count of each vertex in a random-access array (titled a "triangle count" array) indexed by the label of every vertex for fast lookup. During the triangle counting algorithm, this triangle count array is updated where each update takes O(1) time. Thus, overall it takes O(n) time because there are n vertices. The cost at this point is dominated by counting triangles and so the O(n) time to update the array can be ignored in the overall time complexity analysis. Thus, this first stage takes no more time than it does to count the triangles associated with each node.

The second stage in measuring core centrality is to identify the open or closed core-neighborhood triangle sum for each vertex. Note, as discussed below, this step can be skipped for the neighborhood centrality measure. Recall the core-triangle neighborhood triangle sum of a vertex is the sum of the triangle counts of the triangle neighbors of the selected vertex, meaning only the neighbors that participate in a triangle with that vertex are included in the triangle-neighborhood triangle sum.

The triangle-neighborhood triangle sum is computed using the following process. Let a vertex u be higher-ordered than a vertex v if d(u)>d(v) or in the case of a tie, u>v meaning the label of u is greater than the label of v.

For every higher-ordered neighbor h of a vertex v, check if there is at least one common neighbor between h and v. This is accomplished by checking if there is an (h, x) edge for any neighbor x of v. If we find just one common neighbor we can stop checking because then we know that h, v are triangle neighbors. The common neighbor check is only needed if h is higher-order than v. The reason is because a vertex cannot have more than $\sqrt{m}$ neighbors having higher degree (if $d(v) \geq \sqrt{m}$ and each of v's high degree neighbors u also have $d(v) \geq \sqrt{m}$, then there would be more than m edges in the graph which is not possible). Therefore we perform $O(\sqrt{m} \, d(v))$ checks for every vertex. Checking if there is an (h, x)∈E edge is possible in O(1) time using a suitable data structure such as a matrix, or if space is a concern, then an array or hash table of edges, or each neighborhood can be stored as a hash table so an equivalent check is determining if h is in the neighborhood set of x. In total, finding the triangle neighbors of every vertex is possible in $$\sqrt{m} \sum_{v \in V} d(v) = O(m^{3/2})$$

time because each vertex compares its neighborhood set N(v) no more than $\sqrt{m}$ times for the common neighbor checks, and each N(v) has size d(v). Thus finding triangle neighbors for every vertex takes the same time as counting triangles.

Continuing in this second stage of finding the core-neighborhood triangle sum for each vertex, once a triangle neighbor u of v is determined, we update another array indexed by vertex labels with the triangle neighborhood counts for u and v. The effect of this is then each lower-ordered vertex in a triangle will give its triangle count to the higher-ordered vertices in that triangle. Thus at the end of this step, each vertex will have the sum of triangle counts from its triangle-neighbors, as desired. This array is titled the "core-neighborhood triangle sum array". Hence, when checking all u neighbors of v having higher degree (or higher label in case of a tie), for each u that is a triangle neighbor we add the triangle count of v to the existing count in the core-neighborhood triangle sum array indexed at u, and then update the count indexed at v with the triangle count of u. Each update in this core sum array takes O(1) time because looking up the triangle count in the previous "triangle count" array takes O(1) time and adding two numbers and updating the result in the core sum array also takes O(1) time.

Next in this second stage, the core-neighborhood triangle sum is weighted. Weighting is a simple arithmetic operation and takes O(1) time, hence weighting is free.

Now in the third stage, for each vertex v add the triangle counts of every neighbor u of v. Subtract from this sum the value for v stored in the core-neighborhood triangle sum array described previously, to get the final triangle summation from non-triangle neighbors. Now add the triangle count of v to its core-neighborhood triangle sum value to get the final, closed triangle-neighborhood sum for v. Divide this core sum by three, add to it the non-triangle neighbor triangle sum, and divide by the total count of triangles in the graph to get the normalized triangle centrality of v. Performing these operations for every vertex takes the same time as summing over the degrees of every vertex and hence takes O(m) time. This runtime is less than the time to count triangles and therefore can be ignored. The overall time to compute the global triangle centrality is therefore asymptotically equivalent to the time to count triangles, hence $O(m^{3/2})$ time.

Table D below provides a summary of the runtime associated with measuring global triangle centrality and other graph centrality measures including PageRank, eigenvector, betweenness, and degree centrality.

Both PageRank and eigenvector centrality compute the eigenvalues. Using the Power Iteration method, this takes $O(n^3)$ time. Given a sparse graph where m is on order of n, then triangle centrality takes $O(m^3/2) = O(n^{1.5})$ time, which is considerably faster than the time needed to compute the eigenvalues used by PageRank and eigenvector.

The runtime of betweenness centrality is O((mn) time because it must compute all the shortest-paths. Computing the shortest-paths from a vertex to every other vertex can be found using Breadth-First Search (BFS), which takes O((m+n) time. Hence from every vertex, all shortest-paths and therefore betweenness centrality, can be computed in O(n(m+n)) = O(mn) time. This is slower than computing triangle centrality on sparse graphs because it takes $O(n^2)$ time as opposed to $O(n^{1.5})$ time for triangle centrality.

Finally, the time complexity of degree centrality is equivalent to summing all the degrees in the graph, which takes O(m) time. Thus, triangle centrality is a factor of N§ slower than computing degree centrality.

TABLE D

Comparison of runtimes for different centrality measures.

| Centrality | Run-Time |
| --- | --- |
| Page Rank | $O(n^3)$ |
| Eigenvector | $O(n^3)$ |
| Betweenness | O(mn) |
| Degree | O(m) |
| Triangle Centrality | $O(m^{3/2})$ |

Thus, as illustrated in Chart D, the time required to calculate triangle centrality is faster than the time required to calculate PageRank centrality or eigenvector centrality on sparse graphs, but at worst it takes the same time. The time required to calculate triangle centrality is faster than the time required to calculate betweenness centrality by a factor of $\sqrt{n}$, on sparse graphs, and the time required to calculate degree centrality is faster than the time required to calculate triangle centrality by a factor of $\sqrt{m}$. Although more time is needed to calculate triangle centrality than the time needed to calculate degree centrality, as illustrated in Table A-C, triangle centrality consistently and accurately identifies important nodes whereas degree centrality does not consistently and accurately identify important nodes. Although the time needed to calculate triangle centrality is the same as the time needed to calculate PageRank and eigenvector centrality in the worst case, for sparse graphs it is faster, and as illustrated in Table A-C, triangle centrality consistently and accurately identifies important nodes whereas PageRank and eigenvector centrality do not consistently and accurately identify important nodes.

As noted above, neighborhood triangle centrality and core triangle centrality each provide advantages over the prior art centrality measures. For example, the ability to find important nodes not found using other graph centrality measures; a fast runtime with a constant number of steps; and non-iterative computations that may be directly computed. The selection of the particular graph triangle centrality measure to be used (neighborhood triangle centrality or core triangle centrality) will depend upon the characteristics of the particular data set, whether weighting of the triangle neighborhood is desired, and whether the additional run time required for core triangle centrality is acceptable to the user.

While embodiments of the present invention are shown and described, it is envisioned that those skilled in the art may devise various modifications of the present invention without departing from the spirit and scope of the appended claims.

The invention claimed is:

1. A computer-implemented method of identifying influential email users within a plurality of emails based at least in part on neighborhood triangle sums that correspond to measurements of indirect connectivity, the method comprising the steps of:
   obtaining a dataset including the plurality of emails;
   identifying a plurality of email users associated with senders and recipients of the plurality of emails;
   generating a graph that models the plurality of emails including nodes representing the plurality of email users and edges extending between pairs of the nodes representing one or more emails between the plurality of email users;
   determining a local triangle count associated with each of the plurality of email users, wherein a first local triangle count for a first email user among the plurality of email users corresponds to a sum of email triangles that each correspond to emails that connect the first email user with two other email users within the plurality of emails;
   selecting email users of interest, and for each selected email user of interest:
      identifying neighboring email users of the selected email user of interest, wherein neighboring email users have sent or received at least one email from the selected email user of interest,
      summing the local triangle counts for the identified neighboring email users of the selected email user of interest to obtain a neighborhood triangle sum for the selected email user of interest, and
      determining a centrality measurement based at least upon the neighborhood triangle sum for the selected email user of interest;
   determining a ranking of the selected email users of interest based upon the centrality measurement for each of the selected email users of interest, wherein a first email user from among the selected email users of interest is associated with a first count of neighboring email users and a second email user from among the selected email users of interest is associated with a second count of neighboring email users less than the first count of neighboring email users, and wherein the second email user is ranked higher than the first email user with the first count of neighboring email users greater than the second count of neighboring email users; and
   presenting the ranking of the selected email users of interest.

2. The method of claim 1, wherein said neighborhood triangle sum is an open neighborhood triangle sum.

3. The method of claim 1, wherein said neighborhood triangle sum is a closed neighborhood triangle sum.

4. The method of claim 1, further comprising normalizing the neighborhood triangle sum for the selected email user of interest.

5. The method of claim 4, wherein the normalizing is provided using at least one of: a total possible neighborhood triangle sum and a global triangle count.

6. A computer-implemented method of identifying influential members within a social network based at least in part on core-neighborhood triangle sums and non-triangle-neighborhood triangle sums that correspond to measurements of indirect connectivity, the method comprising the steps of:
   obtaining a dataset including established relationships between members of the social network;
   identifying a plurality of members of the social network;
   generating a graph that models the social network including nodes representing the plurality of members of the social network and edges extending between pairs of the nodes representing the established relationships between the plurality of members of the social network;
   determining a local triangle count associated with each of the plurality of members of the social network, wherein a first local triangle count for a first member among the plurality of members of the social network corresponds to a sum of member triangles that each correspond to established relationships that connect the first member with two other members of the social network;
   selecting members of the social network as members of interest, and for each selected member of interest:
      identifying neighboring members of the selected member of interest, wherein neighboring members have an established relationship with the selected member of interest,
      categorizing the neighboring members of the selected member of interest to obtain at least one of one or more triangle-neighbors and one or more non-triangle neighbors of the selected member of interest,
      summing the local triangle counts for the one or more triangle-neighbors of the selected member of interest to obtain a core-neighborhood triangle sum for the selected member of interest,
      weighting the core-neighborhood triangle sum for the selected member of interest,
      summing the local triangle counts for the one or more non-triangle-neighbors of the selected member of interest to obtain a non-triangle-neighborhood triangle sum for the selected member of interest, and
      determining a centrality measurement based on the weighted core-neighborhood triangle sum for the selected member of interest and the non-triangle-neighborhood triangle sum for the selected member of interest;
   determining a ranking of the selected members of interest based upon the centrality measurement for each of the selected members of interest, wherein a first member from among the selected members of interest is associated with a first count of neighboring members and a second member from among the selected members of interest is associated with a second count of neighboring members less than the first count of neighboring members, and wherein the second member is ranked higher than the first member with the first count of neighboring members greater than the second count of neighboring members; and presenting the ranking of the selected members of interest.

7. The method of claim 6, wherein the core-neighborhood triangle sum is a closed core-neighborhood triangle sum.

8. The method of claim 6, wherein the core-neighborhood triangle sum is an open core-neighborhood triangle sum.

9. The method of claim 6, wherein weighting the core-neighborhood triangle sum for the selected member of interest is provided by mitigating said core-neighborhood triangle sum for the selected member of interest.

10. The method of claim 9, wherein said mitigating is provided by dividing said core-neighborhood triangle sum for the selected member of interest by a factor of three.

11. The method of claim 6, wherein weighting the core-neighborhood triangle sum for the selected member of interest is provided by enhancing said core-neighborhood triangle sum for the selected member of interest.

12. The method of claim 6, further including normalizing the centrality measurement for the selected member of interest prior to determining the ranking.

13. The method of claim 12, wherein the normalizing is provided using a total possible neighborhood triangle sum.

14. The method of claim 12, wherein the normalizing is provided using a clustering coefficient.

15. The method of claim 12, wherein the normalizing is provided using a global triangle count.

16. A computer-implemented method of identifying influential communicative entities within a communications network based at least in part on neighborhood triangle sums that correspond to measurements of indirect connectivity, the method comprising the steps of:
obtaining a graph representing the communications network that includes a plurality of nodes and a plurality of edges connecting pairs of nodes among the plurality of nodes, wherein the plurality of nodes corresponds to a plurality of communicative entities within the communications network and the plurality of edges corresponds to one or more instances of communication between pairs of communicative entities;
simultaneously determining a plurality of local triangle counts in parallel based on the communications network, wherein the plurality of local triangle counts includes a local triangle count for each of the plurality of communicative entities, and wherein a first local triangle count for a first communicative entity among the plurality of communicative entities corresponds to a sum of communicative triangles that each correspond to communications that connect the first communicative entity with two other communicative entities within the communications network;
simultaneously identifying a plurality of sets of neighboring communicative entities in parallel, wherein the plurality of sets of neighboring communicative entities includes a set of neighboring communicative entities for each of the plurality of communicative entities, and wherein a first set of neighboring communicative entities for the first communicative entity corresponds to communicative entities within the communications network that are associated with at least one instance of communication with the first communicative entity, and wherein a first neighbor count associated with the first set of neighboring communicative entities for the first communicative entity is greater than a second neighbor count associated with a second set of neighboring communicative entities for a second communicative entity among the plurality of communicative entities;
simultaneously determining a plurality of neighborhood triangle sums in parallel based on the plurality of sets of neighboring communicative entities and the plurality of local triangle counts, wherein the plurality of neighborhood triangle sums includes a neighborhood triangle sum for each of the plurality of communicative entities, and wherein a first neighborhood triangle sum for the first communicative entity corresponds to a sum of local triangle counts for the first set of neighboring communicative entities connected to the first communicative entity within the communications network, and wherein the first neighborhood triangle sum for the first communicative entity is less than a second neighborhood triangle sum for the second communicative entity among the plurality of communicative entities;
generating a ranked list of the plurality of communicative entities within the communications network based on the plurality of neighborhood triangle sums, wherein the second communicative entity is ranked higher than the first communicative entity with the first neighbor count greater than the second neighbor count for the second communicative entity; and
presenting the ranked list of the plurality of communicative entities within the communications network.

17. The method of claim 16, wherein the first neighbor count for the first communicative entity corresponds to a measurement of direct connectivity for the first communicative entity within the communications network, and wherein the first neighborhood triangle sum for the first communicative entity corresponds to a measurement of indirect connectivity for the first communicative entity within the communications network.

18. The method of claim 16, wherein the plurality of communicative entities correspond to members of a social network, and wherein the one or more instances of communication between pairs of communicative entities correspond to at least one of friend requests, friend request approvals, postings, or direct messages.

19. The method of claim 16, wherein the plurality of communicative entities correspond to at least one of email recipients, and wherein the one or more instances of communication between pairs of communicative entities correspond to emails.

20. The method of claim 1 further comprising:
populating a first plurality of elements of a first array in parallel based on the plurality of local triangle counts for the plurality of communicative entities, wherein the first array is indexed based on the plurality of communicative entities;
populating a second plurality of elements of a second array in parallel based on the plurality of sets of neighboring communicative entities for the plurality of communicative entities, wherein the second array is indexed based on the plurality of communicative entities; and
populating a third plurality of elements of a third array in parallel based on the plurality of neighborhood triangle sums for the plurality of communicative entities, wherein the third array is indexed based on the plurality of communicative entities,
wherein the plurality of neighborhood triangle sums for the plurality of communicative entities are determined based on the first plurality of elements in the first array and the second plurality of elements in the second array, and wherein the ranked list of the plurality of communicative entities is generated based on the third plurality of elements within the third array.

\* \* \* \* \*

UNITED STATES PATENT AND TRADEMARK OFFICE
CERTIFICATE OF CORRECTION

| | | |
|---|---|---|
| PATENT NO. | : 12,153,628 B1 | Page 1 of 1 |
| APPLICATION NO. | : 17/099986 | |
| DATED | : November 26, 2024 | |
| INVENTOR(S) | : Burkhardt | |

It is certified that error appears in the above-identified patent and that said Letters Patent is hereby corrected as shown below:

In the Claims

Column 20, Lines 45 should read as follows:
communicative entities correspond to email Signed and Sealed this
Thirteenth Day of January, 2026

John A. Squires
*Director of the United States Patent and Trademark Office*